US010425869B2

(12) United States Patent
Kim et al.

(10) Patent No.: US 10,425,869 B2
(45) Date of Patent: Sep. 24, 2019

(54) METHOD AND DEVICE FOR SERVICE CONTINUITY OF TERMINAL

(71) Applicant: Samsung Electronics Co., Ltd, Gyeonggi-do (KR)

(72) Inventors: Seonghun Kim, Gyeonggi-do (KR); Sung Hwan Won, Seoul (KR); Sangsoo Jeong, Gyeonggi-do (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 15/311,844

(22) PCT Filed: May 18, 2015

(86) PCT No.: PCT/KR2015/004966
§ 371 (c)(1),
(2) Date: Nov. 16, 2016

(87) PCT Pub. No.: WO2015/174804
PCT Pub. Date: Nov. 19, 2015

(65) Prior Publication Data
US 2017/0094570 A1 Mar. 30, 2017

(30) Foreign Application Priority Data
May 16, 2014 (KR) .................. 10-2014-0059311

(51) Int. Cl.
*H04W 36/08* (2009.01)
*H04W 36/00* (2009.01)
(Continued)

(52) U.S. Cl.
CPC ........ *H04W 36/08* (2013.01); *H04W 36/0011* (2013.01); *H04W 36/0033* (2013.01);
(Continued)

(58) Field of Classification Search
CPC .... H04L 5/0053; H04W 24/02; H04W 24/10; H04W 76/021; H04W 76/023;
(Continued)

(56) References Cited

U.S. PATENT DOCUMENTS

2013/0196638 A1    8/2013  Kim et al.
2013/0229931 A1\*  9/2013  Kim ...................... H04W 24/10
                                                                                  370/252
(Continued)

FOREIGN PATENT DOCUMENTS

KR      20130063644      6/2013
KR      20130065357      6/2013
(Continued)

OTHER PUBLICATIONS

International Search Report dated Aug. 24, 2015 in connection with International Application No. PCT/KR2015/004966, 5 pages.
(Continued)

*Primary Examiner* — Raj Jain

(57) ABSTRACT

Disclosed are: a communication method for incorporating an IoT technique with a 5G communication system for supporting a higher data transmission rate than that of a 4G system or a subsequent system; and a system therefor. The present invention can be applied to intelligent services (for example, services related to smart homes, smart buildings, smart cities, smart cars or connected cars, health care, digital education, retail business, security, safety, and the like) on the basis of a 5G communication technique and IoT-related techniques. A method for transmitting and receiving a signal by a base station in a mobile communication system comprises the steps of: receiving a handover request message including a first information related to a device-to-device
(Continued)

(D2D) service for a handover target terminal; and allocating D2D resources to the terminal based on the handover request message.

14 Claims, 11 Drawing Sheets

(51) Int. Cl.
*H04W 36/16* (2009.01)
*H04W 36/18* (2009.01)
*H04W 76/23* (2018.01)
*H04W 72/04* (2009.01)
*H04W 4/70* (2018.01)
*H04W 92/18* (2009.01)
*H04W 36/14* (2009.01)

(52) U.S. Cl.
CPC ....... *H04W 36/0055* (2013.01); *H04W 36/16* (2013.01); *H04W 36/18* (2013.01); *H04W 72/044* (2013.01); *H04W 76/23* (2018.02); *H04W 4/70* (2018.02); *H04W 36/03* (2018.08); *H04W 36/14* (2013.01); *H04W 72/048* (2013.01); *H04W 92/18* (2013.01)

(58) Field of Classification Search
CPC ............. H04W 76/025; H04W 76/043; H04W 36/0055; H04W 36/0094; H04W 36/16
See application file for complete search history.

(56) References Cited

U.S. PATENT DOCUMENTS

| | | | |
|---|---|---|---|
| 2014/0057667 A1* | 2/2014 | Blankenship | H04L 67/303 455/500 |
| 2014/0105178 A1* | 4/2014 | Jang | H04W 36/0055 370/331 |
| 2014/0213221 A1* | 7/2014 | Chai | H04W 72/0493 455/411 |
| 2014/0213250 A1 | 7/2014 | Baek et al. | |
| 2014/0295815 A1* | 10/2014 | Cho | H04W 40/20 455/418 |
| 2015/0230144 A1 | 8/2015 | Wu et al. | |
| 2017/0094570 A1* | 3/2017 | Kim | H04W 36/08 |

FOREIGN PATENT DOCUMENTS

| | | |
|---|---|---|
| KR | 20130100807 | 9/2013 |
| KR | 20140096955 | 8/2014 |
| WO | 2014071600 A1 | 5/2014 |
| WO | 2014163383 A1 | 10/2014 |

OTHER PUBLICATIONS

Written Opinion of the International Searching Authority dated Aug. 24, 2015 in connection with International Application No. PCT/KR2015/004966, 4 pages.

* cited by examiner

METHOD AND DEVICE FOR SERVICE CONTINUITY OF TERMINAL

CROSS-REFERENCE TO RELATED APPLICATION(S)

The present application claims priority under 35 U.S.C. § 365 to International Patent Application No. PCT/KR2015/004966 filed May 18, 2015, entitled "METHOD AND DEVICE FOR SERVICE CONTINUITY OF TERMINAL, and, through International Patent Application No. PCT/KR2015/004966, to Korean Patent Application No. 10-2014-0059311 filed May 16, 2014, each of which are incorporated herein by reference into the present disclosure as if fully set forth herein.

TECHNICAL FIELD

The present invention relates to a method and apparatus for securing continuity of a D2D service. In particular, the present invention relates to a method and apparatus for securing service continuity when a terminal moves from one PLMN to another in such a way that a base station and network devices of the corresponding PLMN acquire D2D service authorization information and allocate efficiently D2D resources to the terminal.

BACKGROUND ART

In order to meet the increasing demand for wireless data traffic since the commercialization of 4G communication systems, the development focus is on the $5^{th}$ Generation (5G) or pre-5G communication system. For this reason, the 5G or pre-5G communication system is called a beyond 4G network communication system or post Long Term Evolution (LTE) system. Consideration is being given to implementing the 5G communication system in millimeter wave (mm Wave) frequency bands (e.g., 60 GHz bands) to accomplish higher data rates. In order to increase the propagation distance by mitigating propagation loss in the 5G communication system, discussions are underway about various techniques such as beamforming, massive MIMO, Full Dimensional MIMO (FD-MIMO), array antenna, analog beamforming, and large scale antenna. Also, in order to enhance network performance of the 5G communication system, developments are underway of various techniques such as evolved small cell, advanced small cell, cloud Radio Access Network (cloud RAN), ultra-dense network, Device to Device (D2D) communication, wireless backhaul, moving network, cooperative communication, Coordinated Multi-Points (CoMP), and interference cancellation. Furthermore, the ongoing research includes the use of Hybrid FSK and QAM modulation and Sliding Window Superposition Coding (SWSC) as Advanced Coding Modulation (ACM), Filter Bank Multi Carrier (FBMC), Non-Orthogonal Multiple Access (NOMA), and Sparse Code Multiple Access (SCMA).

Meanwhile, the Internet is evolving from a human-centric communication network in which information is generated and consumed by humans to the Internet of Things (IoT) in which distributed things or components exchange and process information. The combination of the cloud server-based Big data processing technology and the IoT begets Internet of Everything technology. In order to secure the sensing technology, wired/wireless communication and network infrastructure, service interface technology, and security technology required for implementing the IoT, recent research has focused on the sensor network, Machine to Machine (M2M), and Machine Type Communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy Information Technology (IT) and convergence of various industries.

Thus there are various attempts to apply the IoT to the 5G communication system. For example, the sensor network, Machine to Machine (M2M), and Machine Type Communication (MTC) technologies are implemented by means of 5G communication technologies such as beamforming, MIMO, and array antenna. The application of the aforementioned cloud RAN as a big data processing technology is an example of convergence between the 5G and IoT technologies.

Until now, wireless communication systems have been developed in a way of providing users with connection and communication services via base stations or network entities. Recently, wireless communication system-based inter-device communication technology has been developed under the name of Device-to-Device (D2D) or Proximity Service (ProSe), and this has attracted much interest.

D2D users may use the service by exchanging signals. For example, it may be necessary for a user to perform discovery to find another user interested in the D2D communication and communicate with the found user. The D2D communication service may be used for commercial purposes or public safety.

The D2D service may be provided to users with frequency resources assigned under the assistance of a base station and network entities. In detail, the base station and network may assign radio resources to the user for data communication.

Meanwhile, there is a need of a method and apparatus for providing the D2D communication service continuously even when the D2D user moves from one area to another.

DISCLOSURE OF INVENTION

Technical Problem

The present invention aims to provide a method and apparatus for providing a D2D service or a Proximity Service (ProSe) that allows terminals in proximity to discover or communicate with each other seamlessly even when the terminals are roaming. The base station checks D2D service authorization information of the Public Land Mobile Network (PLMN) serving the terminal and allocates D2D service resources to the terminal based on the authorization information. Accordingly, when the terminal moves to the coverage area of a base station belonging to the same PLMN, the D2D service authorization information is still valid; thus, the terminal can use the D2D service seamlessly based on the D2D service authorization information.

In the case where the terminal moves from one PLMN to another PLMN, the base station of the new PLMN checks whether the terminal is authorized for use of the D2D service in the new PLMN and then allocates D2D service resources to the terminal. Accordingly, the base station of the new PLMN that is serving the roaming terminal has to receive the information concerning the D2D service from a network node to acquire the D2D service authorization information of the PLMN. Typically, the information acquisition procedure of the base station is performed after a handover has been completed. Accordingly, the terminal in a handover situation may not receive the service because the base station cannot allocate D2D service resources to the terminal before receiving the D2D service authorization information. Such a suspension may cause significant problems even when the D2D service is provided for a public safety purpose in a Mission Critical situation.

Accordingly, the present invention aims to provide a method and apparatus for providing the D2D service seamlessly even when the terminal is in the handover procedure in such a way that the base station serving the terminal roaming from one PLMN to another PLMN acquires the D2D service authorization information (authorized indication) for the user and allocates D2D service resources to the terminal promptly. Also, it is obvious that the present invention is applicable to the case where a terminal is roaming within the same PLMN service area.

The objects of the present invention are not limited to the aforesaid, and other objects not described herein will be clearly understood by those skilled in the art from the descriptions below.

Solution to Problem

In accordance with an aspect of the present invention, a signal transmission/reception method of a base station in a mobile communication system includes receiving a handover request message including a first information concerning a device-to-device (D2D) service for a terminal to be handed over and allocating D2D resources to the terminal based on the handover request message.

In accordance with another aspect of the present invention, a base station of a mobile communication system includes a transceiver for transmitting/receiving signals and a controller which controls the transceiver to receive a handover request message including a first information concerning a device-to-device (D2D) service for a terminal to be handed over and allocates D2D resources to the terminal based on the handover request message.

Advantageous Effects of Invention

The communication method and apparatus of a base station and network entities constituting a mobile communication system according to the present invention is advantageous in terms of providing communication service seamlessly to a terminal roaming from one PLMN to another in such a way that the base station of the new PLMN acquires D2D service authorization information (authorized indication) concerning the terminal and allocates D2D service resources to the terminal based on the authorized indication.

The present invention is advantageous in terms of allowing a terminal to return to a PS network in a CSFB situation in which the terminal cannot connect to a CS network.

The advantages of the present invention are not limited to the aforesaid, and other advantages not described herein be clearly understood by those skilled in the art from the descriptions below.

MODE FOR THE INVENTION

Figure 1A:
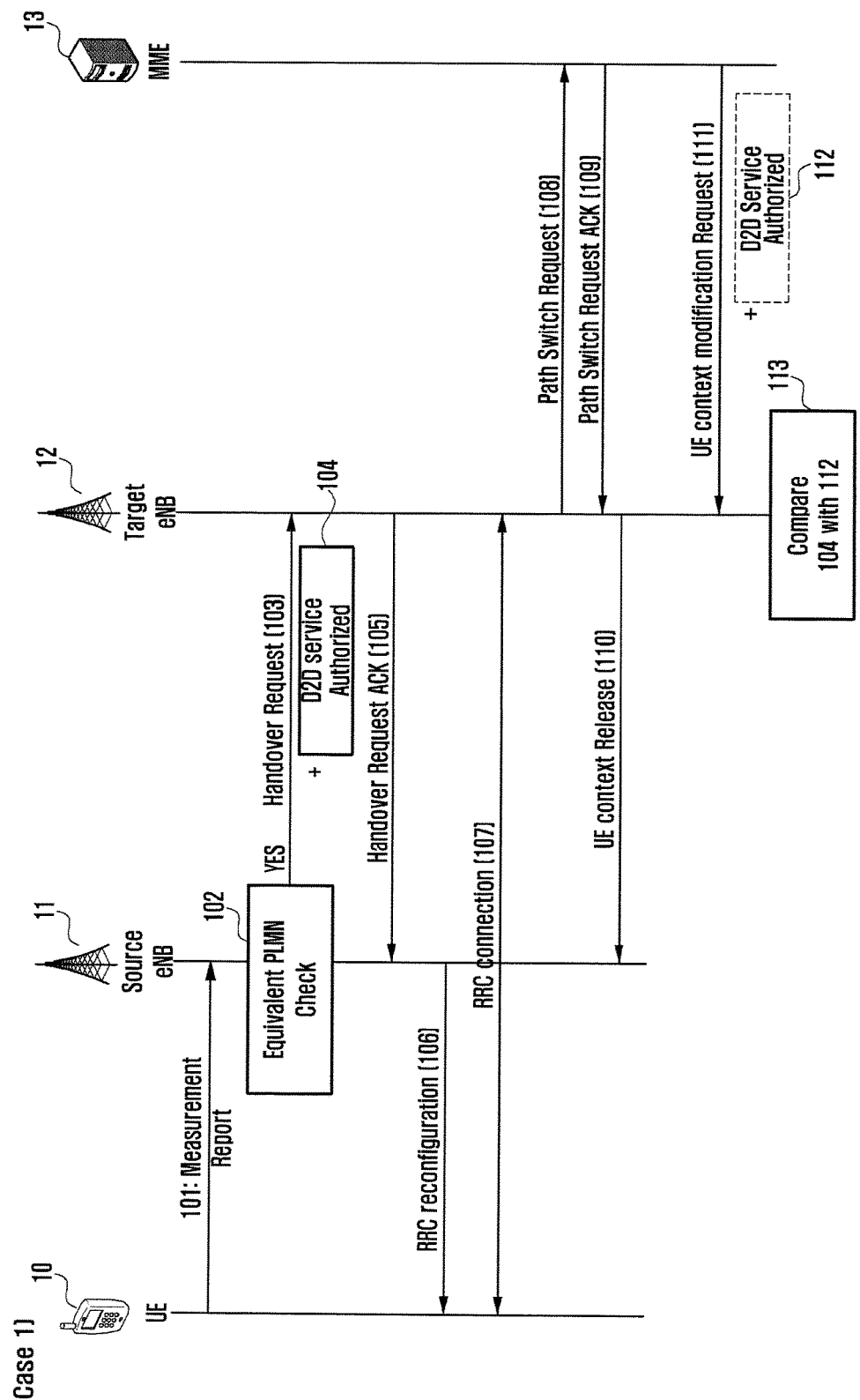
FIGS. 1A and 1B are signal flow diagrams illustrating a D2D information exchange procedure for inter-eNB handover according to an embodiment of the present invention.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

For the same reason, some of elements are exaggerated, omitted, or simplified in the drawings and in practice the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings; however, the present invention may be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Throughout the specification, the term "Device to Device (D2D)" may be used in a concept similar to Proximity Service (ProSe), and the embodiments of the present invention may be applied to all communication systems supporting the D2D or ProSe communication in a way similar to those proposed in the embodiments of the present invention.

In an embodiment, it is necessary to provide a base station with the information on whether the user is authorized for use of the D2D service in the serving PLMN in order for the base station to allocate D2D service resources to the terminal based on the provided information. In more detail, a base station of the PLMN to which the user has roamed has to acquire the D2D service authorization information quickly to allocate D2D service resources to the terminal in a handover procedure, thereby providing the D2D service seamlessly. There is therefore a need of a method and apparatus for sharing efficiently between the base station and network entities the D2D service authorization information of a user.

It should be noted that the operations of the respective entities may be executed in the order of reference numbers, simultaneously, parallel, or out of order, throughout the embodiments.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the embodiments of the present invention are directed to Long Term Evolution (LTE) and Evolved Packet Core (EPC) represented by Radio Access Network and the Core Network as standardized by the 3GPP, it will be understood by those skilled in the art that the present invention can be applied even to other communication systems having a similar technical background and channel format, with a slight modification, without departing from the spirit and scope of the present invention. The D2D service represents all direct inter-device communication services, and the Proximity Service (ProSe) of the 3GPP standard is a representative example thereof. It is obvious that the embodiments of the present invention can be applied to all communication environments supporting direct inter-device communication technologies including ProSe.

The base station may store the PLMN-specific D2D service authorization information per each terminal it serves. In detail, the base station may receive the aforementioned information from an MME and store the information, which is referred to as D2D service authorization information or ProSe Authorized Indication particularly for the ProSe. The base station may allocate resources to the D2D terminal based on the above information to provide the terminal with the D2D service. That is, the D2D service authorization information is valid in the PLMN serving the terminal (serving PLMN). In an embodiment, the base station may manage a list of PLMNs equivalent to the serving PLMN (Equivalent PLMNs) (e.g., Handover Restriction List).

Figure 1B:
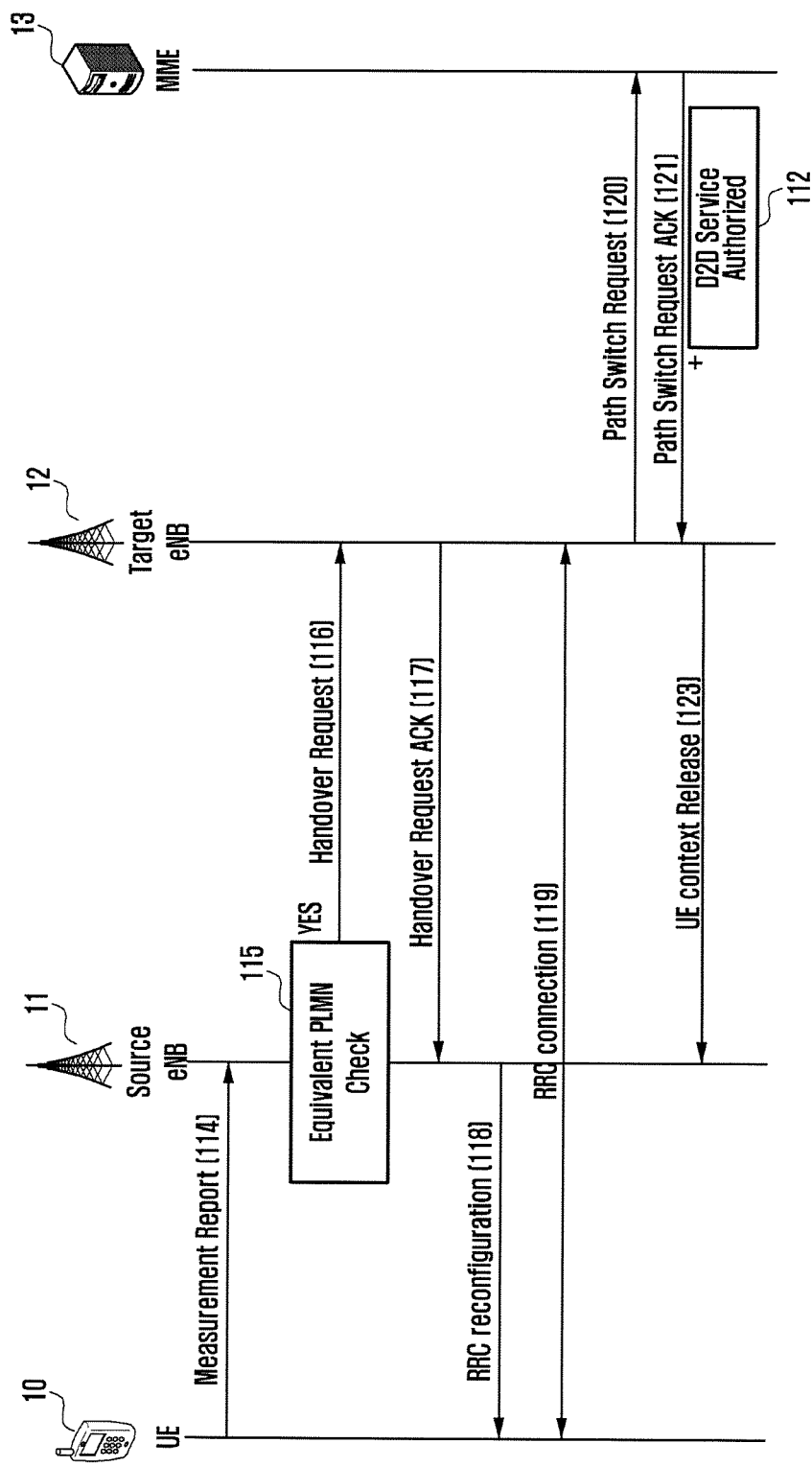

FIGS. 1A and 1B are signal flow diagrams illustrating procedures for exchanging D2D service authorization information between base stations (eNBs) and allocating resources for the D2D service during an inter-eNB handover (X2 handover) according to an embodiment of the present invention. FIGS. 1A and 1B show methods for exchanging D2D information for inter-eNB handover according to an embodiment of the present invention.

Although it is assumed in this embodiment that the terminal (UE) being served by the Serving PLMN is authorized for use of the same D2D service in the Equivalent PLMN, the procedure of this embodiment is applicable to other cases.

In this embodiment, the information indicating that the UE is authorized for use of the D2D service in all PLMNs contained in the Equivalent PLMN list may be transmitted to the eNB or the MME for X2 handover and S1 handover of the UE between the Equivalent PLMNs. If the information indicating that the UE is authorized for use of the D2D service in all PLMNs contained in the Equivalent PLMN list is present, it is always possible to maintain the D2D service continuity during the handover between Equivalent PLMNs.

In reference to FIG. 1A, at least one of the UE 10, the source eNB 11, the target eNB 12, and the MIME 13 may communicate signals with other entities. This embodiment is directed to a situation where the UE 10 is handed over from the source eNB 11 to the target eNB 12.

The UE 10 may transmit a measurement report to the source eNB 11 at step 101. In an embodiment, the measurement report may include at least one of PLMN information, cell ID, and received signal strength that are provided by neighboring eNB s.

In the state that the UE 10 is roaming, the source eNB 11 serving the UE 10 may make a handover decision to the target eNB 12 based on the measurement report transmitted by the UE 10.

The source eNB 11 may check the equivalent PLMN list to determine whether the target eNB 12 belongs to one of the equivalent PLMNs at step 102.

The source eNB 11 may transmit a handover request for inter-eNB handover (X2 handover) based on the check result at step 103. In detail, the source eNB 11 may transmit a handover request message to the target eNB 12 under the assumption that the UE 10 is authorized for use of the D2D service in the equivalent PLMNs.

In an embodiment, the source eNB 11 may generate Case 1) the handover request message including a D2D service authorization information (see FIG. 1A) or Case 2) a Path Switch Request ACK including the D2D service authorization information (see FIG. 1B) to allocate resources to the UE 10 for providing the service seamlessly.

Case 1)

The source eNB 11 transmits to the target eNB 12 the handover request message including the D2D service authorization information 104 to initiate the handover at step 103.

In an embodiment, the target eNB 12 may determine that the UE 10 is authorized for use of the D2D service in the corresponding PLMN based on the information received at step 103. In an embodiment, whether the UE 10 is authorized for use of the D2D service may be determined based on the D2D-related information as denoted by reference number 104.

In an embodiment, the source eNB 11 or the target eNB 12 may allocate resources to the UE 10 for providing the D2D service during the handover procedure.

At step 105, the target eNB 12 may transmit a handover request acknowledgement in response to the handover request message received at step 103.

At step 106, the source eNB 11 may transmit to the UE 10 the information for use in establishing an RRC connection with the target eNB 12.

Upon receipt of the information for RRC connection of the target eNB 12 at step 106, the UE 10 may establish an RRC connection with the target eNB 12 based on the information at step 107.

Next, the target eNB 12 may transmit a path switch request message to the MME 13 at step 108, receive a path switch request ACK message from the MME 13 at step 109, and transmit a UE context release message to the source eNB 11 at step 110 to complete the handover procedure. In an embodiment, the path switch request message may include the UE-specific information of the UE 10, particularly, the PLMN list in which the UE 10 is authorized for use of the D2D service. In an embodiment, the target eNB 12 may allocate resources for D2D communication to the UE 10 after step 109.

In an embodiment, the information received from the source eNB 11 at step 104 may be inaccurate because the information is not generated by the MME 13.

Accordingly, if it is determined that the information received at step 104 is inaccurate, the MME 13, which has received the information on the UE 10 at step 108 after the handover, may transmit the accurate UE information to the target eNB 12 at step 111 after the completion of handover.

In an embodiment, the message transmitted at step 111 may be a UE context modification request including the UE-specific D2D service authorization information 112.

The target eNB 12 may acquire the D2D service authorization information of the UE 10 from the message received at step 111.

The target eNB 12 may compare the D2D service authorization information 112 with the D2D service authorization information 104 at step 113 and determine whether the UE 10 is authorized for use of the D2D service based on the information 112 received from the MME 13.

For example, if the information 112 received from the MME 130 is unlike the information 104 indicating that the UE 10 is authorized for use of the D2D service and indicates that the UE 10 is not authorized for use of the D2D service, the target eNB 12 may release the resources allocated to the UE 10.

Case 2

In the embodiment of FIG. 1B, at least one entity of the UE 10, the source eNB 11, the target eNB 12, and the MME 13 may communicate signals with other entities. This embodiment is directed to a situation where the UE 10 is handed over from the source eNB 11 to the target eNB 12.

Step 114 is identical with step 101 of Case 1), and step 115 is identical with step 102 of Case 1).

In an embodiment, after step 115, the source eNB 11 may transmit a handover request message to the target eNB 12 based on the received information at step 116.

In an embodiment, the handover request message may not include the D2D service authorization information of the UE 10.

The target eNB 12 may make a handover decision based on the handover request message and transmit to the source eNB 11 a handover request ACK message including RRC information for used by the UE 10 in connection thereto at step 117.

At step 118, the source eNB 11 may transmit to the UE an RRC reconfiguration message including the RRC information of the target eNB 12 which has been received at step 117.

At step 119, the UE 10 may establish an RRC connection with the target eNB 12 based on the information received at step 118.

After the RRC connection has been established, at step 120 the target eNB 12 may transmit to the MME 13 a path switch request message to acquire D2D service automation information of the UE 10 in association with the PLMN to which the target eNB 12 belongs. In detail, the target eNB 12 may request to the MME 13 for the D2D service authorization information of the UE 10 through a UE mobility information transfer procedure (path switch request). In an embodiment, the path switch request message may include an indicator indicating whether the D2D service authorization information of the UE is requested to the MME 13.

At step 121, the MME 13 may transmit to the target eNB 12 a path switch request ACK message including the D2D service authorization information 122 in response to the request of step 120.

The target eNB 12 may allocate D2D communication resources to the UE 10 based on the information received at step 121 to provide the UE with the service seamlessly.

The target eNB 12 may transmit to the source eNB 11 a UE context release message to complete the handover procedure at step 123.

In Case 2), the target eNB 12 receives the D2D service authorization information from the MME 13 directly and provides the D2D service based on the received information.

The resource allocation for D2D communication may be performed after step 107 or 109 in Case 1 and after step 121 in Case 2.

Figure 2:
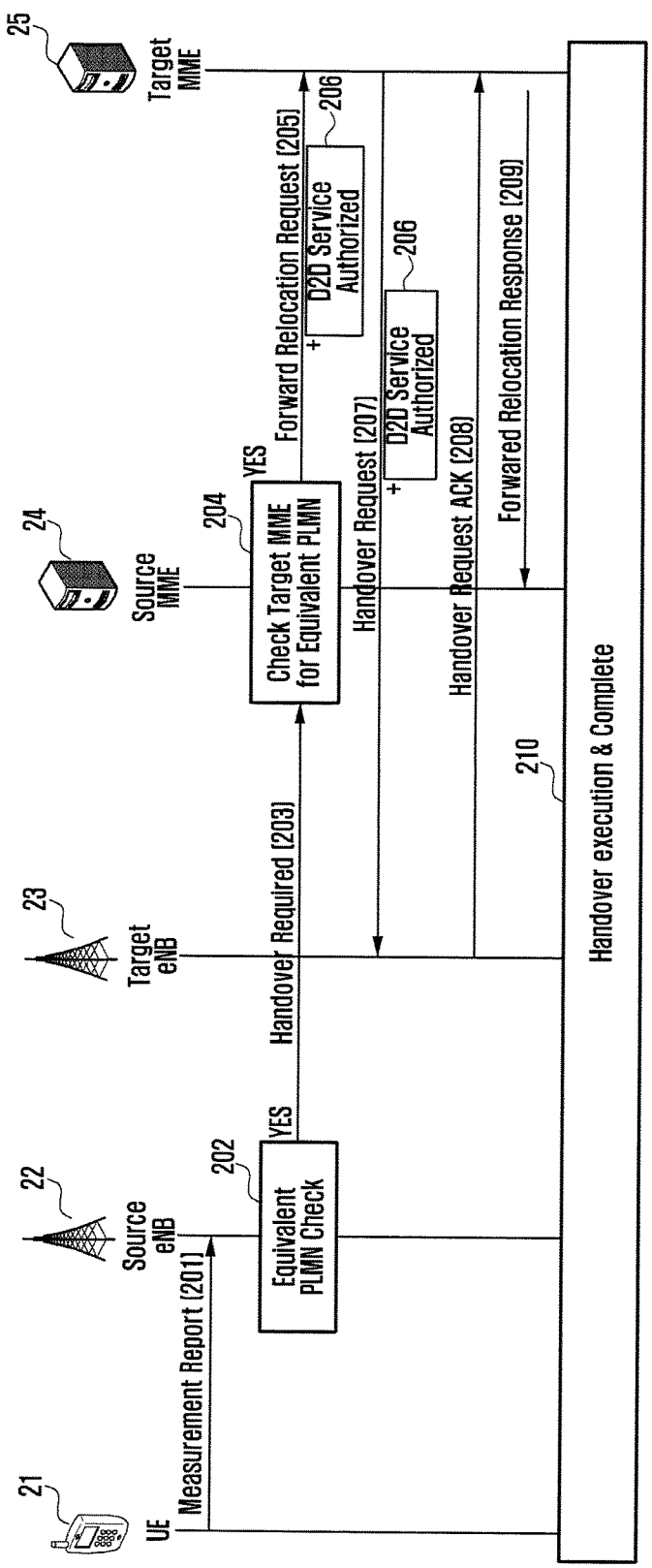
FIG. 2 is a signal flow diagram illustrating a D2D information exchange procedure for S1 handover according to an embodiment of the present invention.

FIG. 2 is a signal flow diagram illustrating an inter-MME S1 handover procedure in which a source MME transmits D2D service authorization information to a target MME, which forwards the information to a target eNB, according to an embodiment of the present invention.

In reference to FIG. 2, at least one of a UE 21, a source eNB 22, a target eNB 23, a source MME 24, and a target MME 25 may communicate signals with other entities. In detail, the UE 21 which is in data communication via the source eNB 22 connected to the source MME 24 is handed over to the target eNB 23 connected to the target MME 25.

Like the embodiment of FIG. 1, in this embodiment it is assumed that the UE is authorized for use of the D2D service in all PLMNs equivalent to the serving PLMN. The information indicating that the UE is authorized for use of the D2D service in all PLMNs contained in the Equivalent PLMN list may be transmitted to the eNB or the MME.

The UE 21 may transmit a measurement report to the source eNB 22 at step 201. In an embodiment, the measurement information may include at least one of PLMN information, cell ID, and received signal strength that are provided by neighboring eNBs. In an embodiment, the source eNB 22 may make a handover decision based on the measurement report transmitted by the UE 21.

The source eNB 22 may determine at step 202 whether the PLMN to which the target eNB 23 belongs is an equivalent PLMN.

The source eNB 22 may transmit to the source MME 34 a handover required message at step 203 based on the determination result to provide the D2D service to the UE 21 seamlessly.

At step 204, the source MME 24 may make a decision for inter-MME Si handover based on the information acquired at step 203. The source MME 24 may check, at step 204, that it has the D2D service authorization information of the UE 21 in association with the PLMN and the equivalent PLMN list for the UE 21 and, on the basis of the equivalent PLMN list, that the target MME 25 belongs to an equivalent PLMN.

At step 205, the source MME 24 may transmit to the target MME 25 a forward relocation request message including the D2D service authorization information 260 based on the determination result.

At step 207, the target MIME 25 may transmit to the target eNB 23 a handover request message based on the received information. The handover request message transmitted from the target MME 25 to the target eNB 23 may include the D2D service authorization information 206.

At step 208, the target eNB 23 may transmit to the target MME 25 a handover request ACK message in response to the handover request message.

At step 209, the target MME 25 may transmit a response message to the source MME 24 in reply to the message received at step 205. In detail, the target MME 25 may transmit a forward relocation response message to the source MME 24.

Then the target eNB 23 may allocate D2D resources to the UE 21 based on the D2D service authorization information received at step 207 to complete the handover.

Although the source and target MMES 24 and 25 are illustrated as separated entities, they may be physically or logically configured as a signal entity.

Figure 3:
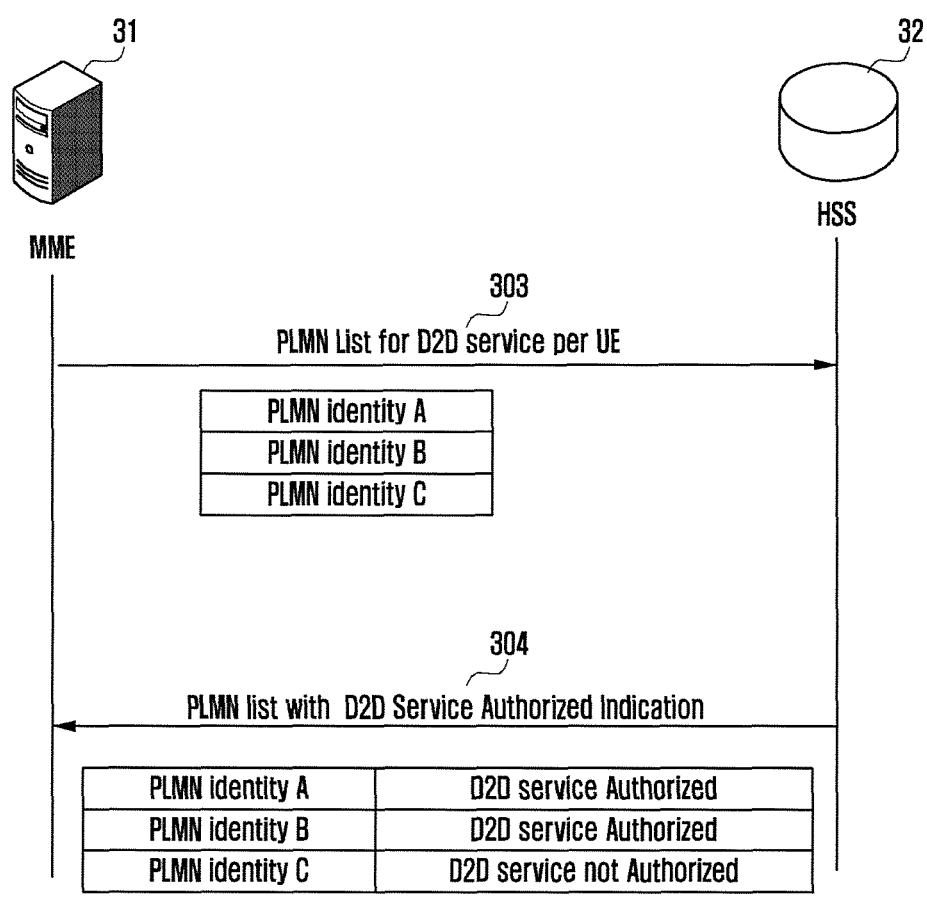
FIG. 3 is a signal flow diagram illustrating a procedure for an MME to receive D2D information from an HSS according to an embodiment of the present invention.

FIG. 3 is a signal flow diagram illustrating a procedure for an MME to transmit a PLMN list to a Home Subscriber Server (HSS) to request for D2D service authorization information per PLMN according to an embodiment of the present invention.

In the embodiment of FIG. 3, the MME 31 and the HSS 32 may communicate signals.

According to this embodiment, the MMIE 31 and an eNB may collect the information on one or more PLMNs in which the UE is authorized for use of the D2D service. In detail, the MME may transmit the D2D service authorization information received from the HSS 32 to the eNB. If there is previously collected and stored D2D service authorization information, the handover is performed based on the previously collected D2D service authorization information, thereby guaranteeing service continuity.

In an embodiment, the MME may store an equivalent PLMN list for the UE and configure and manage the list.

The MME 31, to determine whether the UE is authorized for use of the D2D service in each equivalent PLMN, may transmit at step 303 the PLMN list to the HSS 32. In an embodiment, the PLMN list may include part or whole of the equivalent PLMN information per UE that is stored in the MME 31. In detail, the PLMN list may be the whole or part of the equivalent PLMN list. In order to distinguish from another procedure performed by the MME 31 (e.g., procedure for the MME 31 to receive CSG subscription data from the HSS 32), a message including an indicator indicating the request for the information on whether the D2D service is allowed may be transmitted. The procedure may be performed as part of the procedure available for the MME 31 to inquire of the HSS 32 about the subscriber information. For example, the MME 31 may request to the HSS for a PLMN list containing the PLMNs with the indication on whether the UE is authorized for use of D2D service.

The HSS 32 transmits to the MME 31 at step 304 a list of the PLMNs with the information on whether the user is authorized for use of the D2D service therein in response to the message received at step 303. The list may be transmitted in the form of a bitmap indicating whether the UE is authorized for use of the D2D service in association with each PLMN list.

Figure 4:
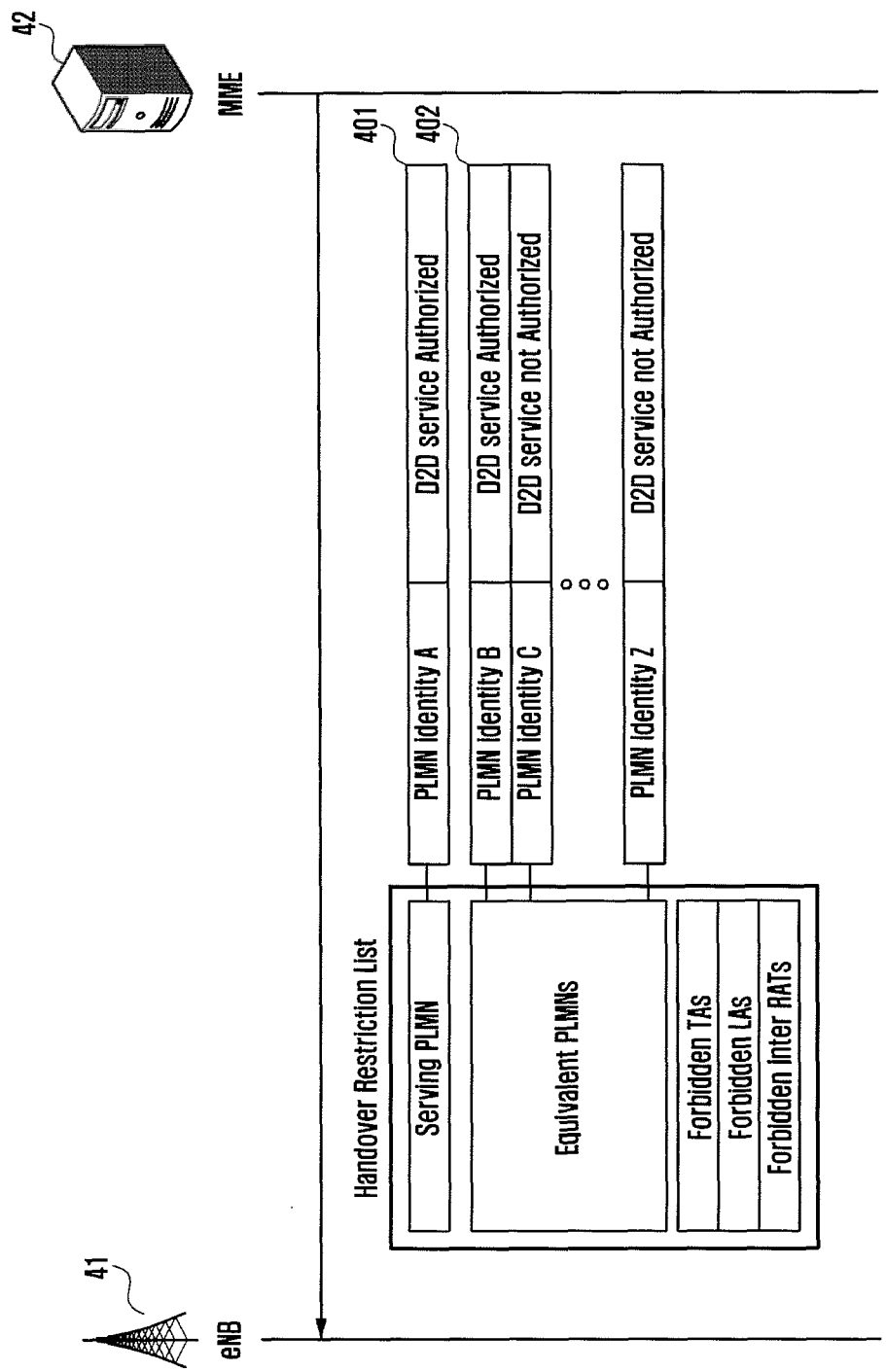
FIG. 4 is a signal flow diagram illustrating a procedure for an MME to transmit D2D information to an eNB according to an embodiment of the present invention.

FIG. 4 is a signal flow diagram illustrating a procedure for an MIME to transmit to an eNB a handover restriction list with D2D service authorization information according to an embodiment of the present invention.

In the embodiment of FIG. 4, the eNB 41 and the MME 42 communicate signals to each other.

According to this embodiment, the Handover Restriction List (HRL) may be a list including at least one of PLMNs serving the UE, equivalent PLMNs, PLMNs forbidden to the UE, and Radio Access Technology forbidden to the UE. In an embodiment, the MME 420 may generate the HRL based on the information received at step 304 of FIG. 3.

The serving PLMN included in the HRL transmitted from the MME 42 to the eNB 41 may be provided with the D2D service authorization information as denoted by reference number 401. Each equivalent PLMN included in the HRL transmitted from the MME 42 to the eNB 41 may be provided with the D2D service authorization information as denoted by reference number 402. The D2D service authorization information 401 and 402 may be transmitted to the eNB 41 by means of a single message or separated messages. According to an embodiment, one of the two pieces of information may be transmitted to the eNB 41. The information 401 and 420 may be included in at least one of all messages that the MME 42 can use to transmit the HRL to the eNB 41 in the LTE system. For example, the MME 42 may transmit the HRL to the eNB 41 using at least one of the Initial Context Request message, the Handover Request message, and the Downlink NAS Transport message.

Figure 5:
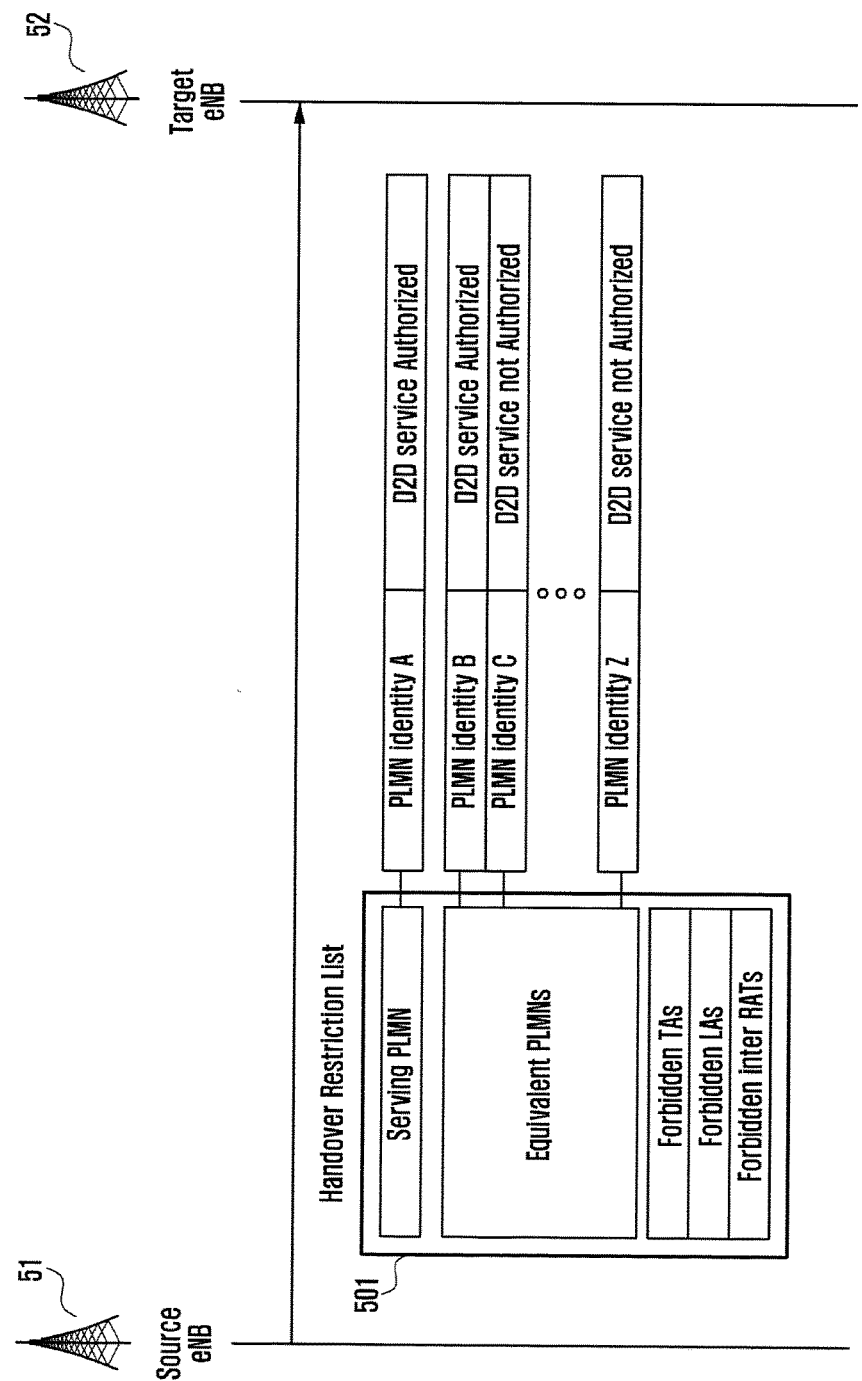
FIG. 5 is a signal flow diagram illustrating a procedure for a source eNB to transmit D2D information to a target eNB according to an embodiment of the present invention.

FIG. 5 is a signal flow diagram illustrating a procedure for an eNB to transmit the HRL received along with the D2D service authorization information to a handover target eNB in X2 handover according to an embodiment of the present invention.

According to an embodiment, the source and target eNBs 51 and 52 may communicate signals to each other.

According to an embodiment, the source eNB 51 may receive the HRL containing the PLMNs with respective D2D service authorization information from an MME and store the HRL. The procedure for receiving the HRL from the MME may be performed according to the embodiment disclosed in FIG. 4.

In an embodiment, if the UE being served by the source eNB 51 moves to another PLMN in the state of using the D2D service, causing X2 handover, the source eNB 51 may transmit to the target eNB 52 the HRL 501 including PLMN with respective D2D service authorization information.

In an embodiment, the target eNB 52 may allocate D2D service resources to the UE based on the information received from the source eNB 51. The target eNB 52 may specify a configuration in adaptation to its state based on the received information. The HRL including the D2D service authorization information may be transmitted using at least one of all messages capable of being used to carry the HRL. For example, the source eNB 51 may transmit the HRL to the target eNB 52 by means of the Handover Request message through the X2 interface.

Figure 6:
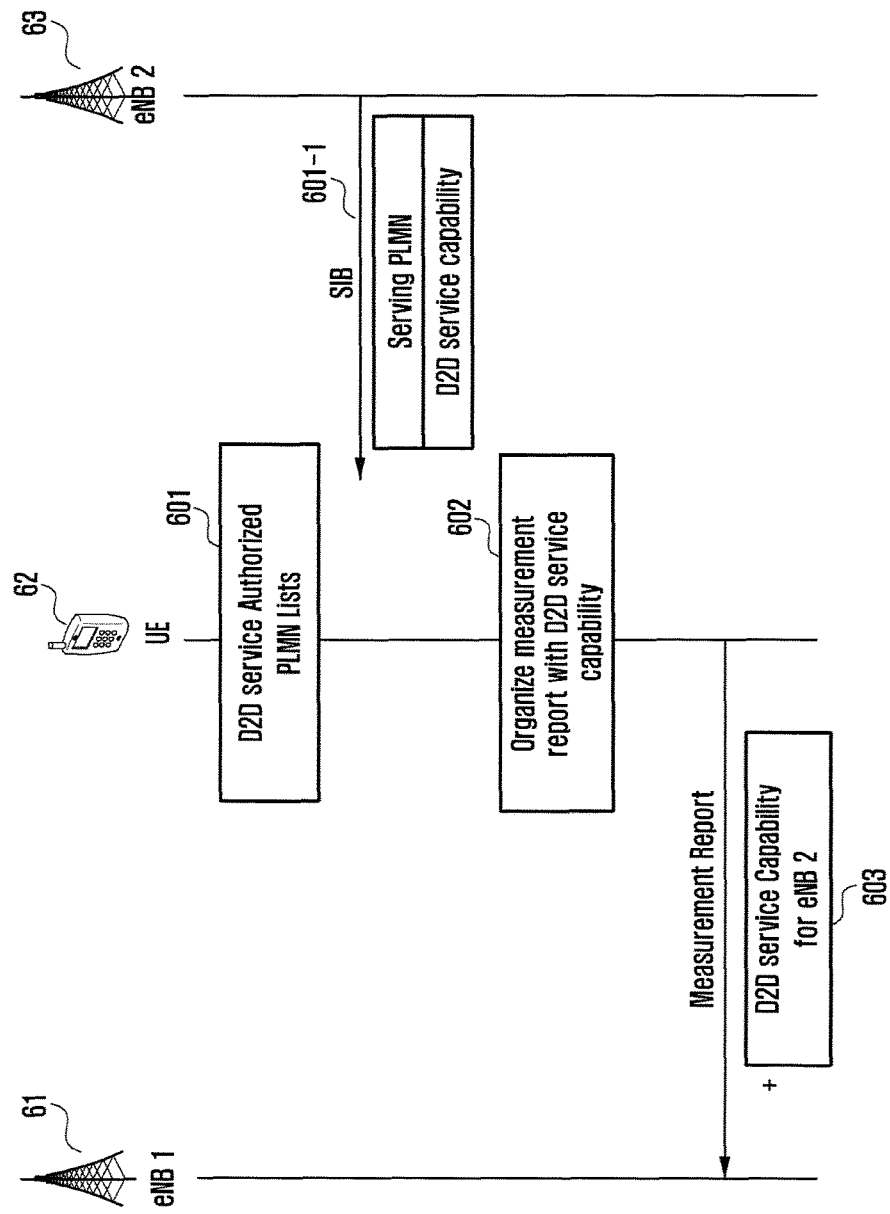
FIG. 6 is a signal flow diagram illustrating a procedure for a UE to transmit D2D information to an eNB according to an embodiment of the present invention.

FIG. 6 is a signal flow diagram illustrating a procedure for a source eNB to transmit information to a target eNB based on the D2D service authorization information of a UE according to an embodiment of the present invention.

In the embodiment of FIG. 6, at least one of the first eNB 61, the UE 62, and the second eNB 63 may communicate with other entities. In an embodiment, the first eNB 61 may be the source eNB communicating data currently with the UE 62, and the second eNB 63 may be the target eNB to communicate signals with the UE 62.

According to this embodiment, the UE 62 may receive and store a list of the PLMNs in which the UE 62 is authorized for use of the D2D service at step 601. In detail, the UE 62 may receive the list of PLMNs in which the UE 62 is authorized for use of the D2D service from a D2D management server (e.g., ProSe Function) and store the PLMN list.

The second eNB 63 may broadcast system information (e.g., System Information Blocks (SIBs)) at step 601-1. In an embodiment, the system information may include the information on the PLMNs to which the cells under control of the second eNB belong and which PLMNs support the D2D service.

Accordingly, the UE 62 may read the system information (e.g., SIBs) broadcast by the neighboring eNBs including the second eNB 63, during the neighboring eNB information collection procedure, to determine whether the eNB managing the corresponding cell supports the D2D service and whether the PLMN of the corresponding cell is included in the list of the PLMNs in which the UE is authorized for use of the D2D service.

The UE 62 may determine at step 602 whether it can use the D2D service continuously based on the information collected from the neighboring eNBs including the second eNB 63.

At step 603, the UE 62 may transmit to the first eNB (source eNB) 61 a measurement report including at least one of the determination results.

Upon receipt of the information transmitted at step 603, the source eNB 61 may determine whether the PLMN of the target eNB 63 supports the D2D service and transmit to the target eNB 63 the D2D service authorization information generated based on the determination result. Upon receipt of the D2D service authorization information, the target eNB 63 may allocate D2D service resources to the UE 62, complete the handover, and receive the D2D service authorization information from the MME to update the corresponding information.

If the Circuit Switched Fallback (CSFB) scheme is used to provide the Circuit Switched (CS) services including voice telephony to the user using the Packet Switched (PS) services, the UE may switch to a 2G or a 3G cell to set up a CS call during the CSFB procedure.

If the target cell selected in the PLMN is a 2G cell that does not support the Dual Transfer Mode (DTM), the UE cannot perform PS data communication during the CS call.

In order to solve this problem, the eNB informs the MME of unavailability of the PS service for the reason that the target cell of the UE is a 2G cell not supporting DTM, the MME may deactivate Guaranteed Bit Rate (GBR) bearers and preserve and suspend non-GBR bearers. Deactivating the GBR bearers and preserving and suspending the non-GBR bearers may be expressed as disabling PS bearers.

However, although it is required for the UE to switch back to the PS network (LTE network in this embodiment), when the UE fails to set up a CS call in the target cell to which the CSFB has been attempted (this may be one of the cases where connection (RRC connection) setup between the UE and the 2G cell is not allowed and the user's call setup is rejected or cancelled during the CSFB procedure), to continue receiving the PS data service, if the MME disables the PS bearers as aforementioned, the UE cannot switch back to the PS network.

In order to solve this problem, an embodiment of the present invention is characterized in that the MME determines, when the eNB notifies the MME of the unavailability of PS service during the CS call of the UE, whether the UE can be switched to the target cell to connect to the CS network and whether to disable the PS bearers and then performs an operation depending on the determination result, instead of disabling the PS bearers immediately upon receipt of the PS service unavailability report.

Figure 7:
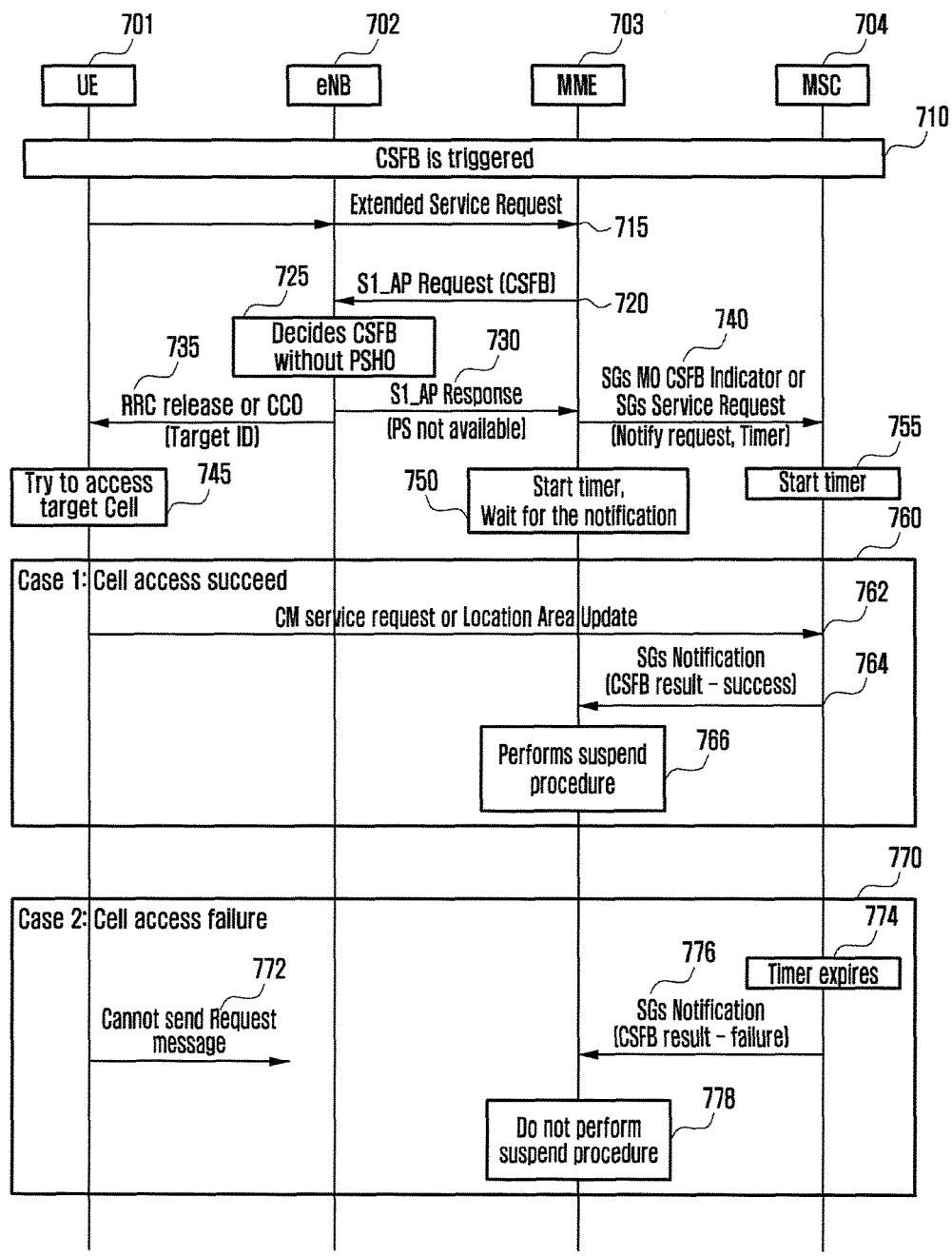
FIG. 7 is a signal flow diagram illustrating signal flows between a UE and network entities in a CSFB procedure according to an embodiment of the present invention.

FIG. 7 is a signal flow diagram illustrating signal flows between a UE and network entities in a CSFB procedure according to an embodiment of the present invention.

In reference to FIG. 7, at least one of the UE 701, the eNB 702, the MME 703, and the Mobile Switching Center (MSC) 704 may communicate signals with other entities.

If CSFB is triggered at step 710, the UE 701 may transmit an extended service request message to the MME 703.

If the extended service request message is received, the MME 703 may transmit a S1_AP message to the eNB 702 at step 720 to instruct the eNB 702 to perform a CSFB procedure.

The eNB 702 may select a target cell for performing the CSFB and, in the present invention, make a decision at step 725 to perform the CSFB without PS handover (PSHO). Whether to perform the PSHO may be determined depending on the UE or network situation and, in this embodiment, regardless of the reason for performing the PSHO.

If the target cell is a 2G cell that cannot use DTM, the eNB 702 may transmit to the UE 701 an RRC connection release message or a cell change order message at step 735. In an embodiment, the RRC connection release message or the cell change order message may include the ID of the target cell to which the UE 701 is handed over.

If the message transmitted by the eNB 702 is received, at step 745 the UE 701 may access to the target cell and perform a CS call setup operation based on the received message.

At step 730, the eNB 702 may transmit to the MME 703 an S1_AP message to notify that the CSFB is performed. The S1_AP message may be a S1_AP Response message including the information indicating that the UE cannot receive the PS service in the target cell.

At step 740, the MME 703 may notify the MSC 704 that the CSFB is performed. The MME 703 may use a SGs AP MO CSFB Indication message for an outgoing CSFB procedure and a SGs AP Service Request message for an incoming CSFB. At least one of the messages may include a request for the information on the CSFB result (success or failure), i.e., the information determined according to whether any control messages for the CS service are communicated with the target cell. Also, at least one of the messages may include the information related to a timer for waiting until success or failure of the CSFB. The information related to the timer may include at least one of a timer start time point, a timer value, and a timer unit.

At step 750, the MME 703 may start the timer after transmitting the message at step 740.

In an embodiment, if a CSFB success message is received from the MSC 704 during the period of the timer, the MME 703 may end the timer, determine the success of the CSFB, and disable the PS bearers for the UE 701. If a result message is not received from the MSC 704 before the expiry of the timer or if a failure notification message is received, the MME 703 may assume the failure of the CSFB and maintain the PS bearers for the UE 701 (i.e., omit a procedure for disabling the PS bearers).

In an embodiment, if the message of step 740 is received from the MME 703, the MSC 704 starts a timer based on the received message. If the MME has transmitted the information related to the timer to the MSC 704 during the above procedure, the MSC 704 determines the timer value based on the received information and starts the timer. If a CS control message is received from the UE 701 during the timer period, the MSC 704 may stop the timer and determine the success of the CSFB. If the CS control message is not received from the UE 701 before the expiry of the timer, the MSC 704 determines the failure of the CSFB.

Hereinafter, descriptions are made in detail of the CSFB success situation 760 and the CSFB failure situation 770 separately.

If the UE 701 succeeds in accessing a cell, it may transmit to the MSC 701 a NAS message (e.g., CM service request or Location area update) at step 762.

Upon receipt of the NAS message, the MSC 704 may stop the timer and notify the MME 703 of the success of the CSFB at step 764.

If the CSFB success notification message is received from MSC 704, the MME 703 stops the timer (if it is running), determines the success of the CSFB, and disables the PS bearers for the UE 701 at step 766. In an embodiment, the timer values for use in the MME 703 and the MSC 704 may be identical with or different from each other, and the timer value of the MME 703 may be greater than that of the MSC 704.

If the UE fails in accessing the cell or no CSFB occurs, the MSC 704 may not receive any message from the UE 701 as denoted by reference number 772.

If the timer is running at the MSC 704 at step 774 and no message is received from the UE 701 before expiry of the timer, the MSC 704 may notify the MME 703 of the CSFB failure at step 776. In detail, the MSC 704 may transmit to the MME 703 a SGs_Notification message including an indicator indicating CSFB success/failure.

If a CSFB failure message is received from the MSC 704, the MME 703 may determine the CSFB failure and maintain the PS bearers for the UE 701 in the available state at step 778.

If the timer is running at the MME 703 at step 778 and no CSFB success/failure message is received before expiry of the timer, the MME 703 may determine CSFB failure and maintain the PS bearers for the UE 701 in the available state.

Figure 8:
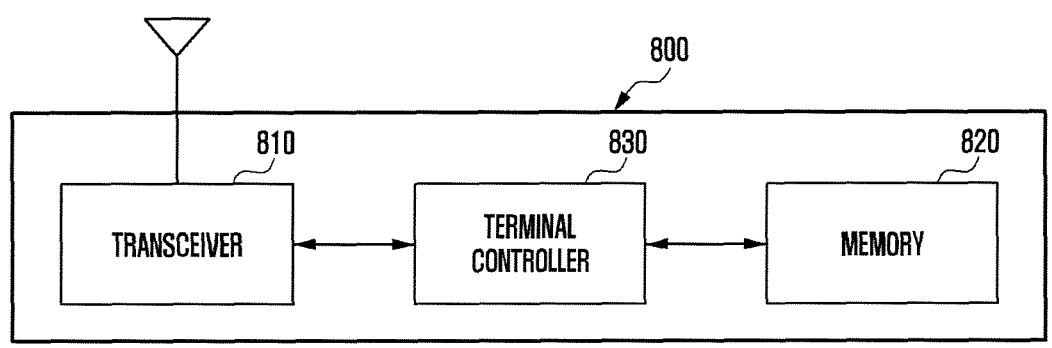
FIG. 8 is a block diagram illustrating a configuration of a terminal according to an embodiment of the present invention.

FIG. 8 is a block diagram illustrating a configuration of a terminal according to an embodiment of the present invention.

In the embodiment of FIG. 8, the UE 800 may include at least one of a transceiver 810, a memory 820, and a terminal controller 830.

The transceiver 810 may communicate signals with at least one of the entities of the mobile communication system including an base station.

The memory 820 may store at least one of the information concerning the operation of the UE 800 and data communicated by means of the transceiver 810. In detail, the memory 820 may store the neighboring base station measurement information and a list of PLMNs in which the UE is authorized for D2D communication.

The terminal controller 830 may control the overall operations of the UE 800. The terminal controller 830 may also control the UE to transmit the measurement report to a source base station for use in making a handover decision, receive RRC information from a handover target base station, and establish an RRC connection with the target base station based on the received information.

Figure 9:
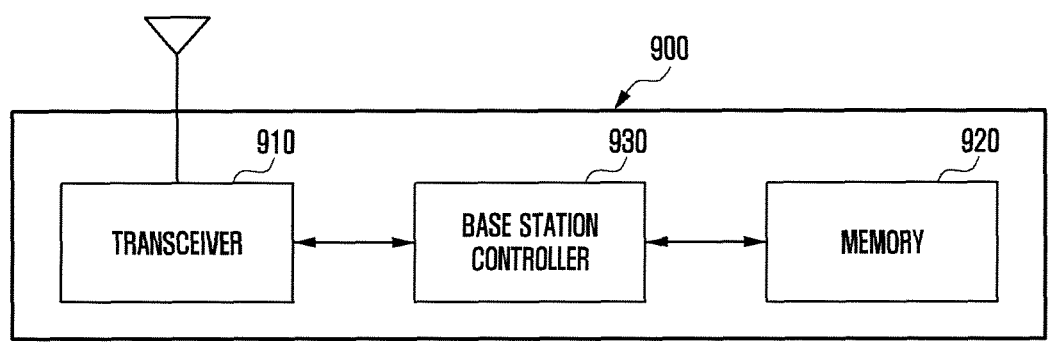
FIG. 9 is a block diagram illustrating a configuration of an base station according to an embodiment of the present invention.

FIG. 9 is a block diagram illustrating a configuration of an base station according to an embodiment of the present invention.

In reference to FIG. 9, the base station 900 may include at least one of a transceiver 910, a memory 920, and a base station controller 930. In an embodiment, the base station 900 may operate as a source base station or a target base station.

The transceiver 910 may communicate signals with at least one of the entities of a mobile communication system including UEs and MMEs.

The memory 920 may store at least one of the information related to the operation of the base station 900 and data communicated by means of the transceiver 910. In detail, the memory 920 may store an equivalent PLMN list of the UE communicating with the base station and D2D service authorization information received from a target base station or an MME.

The base station controller 930 may control the overall operations of the base station. The base station controller 930 may transmit to a target base station a handover request based on the measurement report received from a UE. The handover request may include D2D service authorization information. The base station controller 930 may control transmitting/receiving RRC information concerning the connection of the UE and the information concerning path switch operation with the MME. The base station controller 930 may also control receiving a UE context modification request message from the MME and acquire the D2D service authorization information from the UE context modification request information. The base station controller 930 may also perform resource allocation based on the result of comparing the D2D service authorization information received from the source base station and the D2D service authorization information received from the MME.

Figure 10:
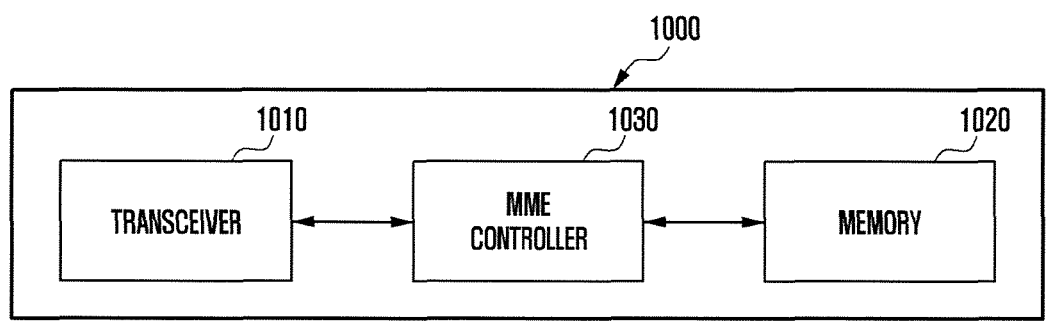
FIG. 10 is a block diagram illustrating a configuration of a Mobility Management Entity (MME) according to an embodiment of the present invention.

FIG. 10 is a block diagram illustrating a configuration of a Mobility Management Entity (MME) according to an embodiment of the present invention.

In the embodiment of FIG. 10, the MME 1000 may include at least one of a transceiver 1010, a memory 1020, and a MME controller 1030. In an embodiment, the MME 1000 may operate as a source MME or a target MME.

The transceiver 1010 may communicate signals with at least one of the entities of a mobile communication system including at least one of a UE, an base station, a HSS, and an MCS.

The memory 1020 may store the information related to the operations of the MME 1000 and data communicated by means of the transceiver 1010. In detail, the memory 1020 may store the UE-specific D2D service authorization information received from an HSS or the source MME.

The MME controller 1030 may control the overall operations of the MME. The MME controller 1030 may control receiving the UE-specific D2D service authorization information per PLMN from the HSS and transmitting the related information to the target MME or base station. The MME controller 1030 may also control transmitting/receiving signals related to the handover of the UE. In the above described embodiments, the steps and message transmissions may become the targets of being selectively carried out or omitted. In each embodiment of the present invention, it is not necessary for the operations to be performed in the sequential order as depicted, and they may be performed in a changed order.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Therefore, a detailed description of the above should not be construed as limited in all respects, but it should be considered exemplarily. The scope of the present invention is to be determined by a reasonable interpretation of the appended claims and includes all the changes within the equivalent range of the present invention.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A signal transmission and reception method by a base station in a mobile communication system, the method comprising:
   receiving a handover request message including first information related to a device-to-device (D2D) service for a terminal, the first information comprising a first list corresponding to at least one public land mobile network (PLMN) identifier indicating whether the terminal is authorized for the D2D service; and
   allocating D2D resources to the terminal based on the handover request message including the first information, if a PLMN identifier of the base station corresponds to the at least one PLMN identifier of the first list comprised in the first information.

2. The method of claim 1, further comprising:
   receiving, from a mobility management entity (MME), second information on the D2D service for the terminal, the second information comprising a second list corresponding to at least one PLMN identifier indicating whether the terminal is authorized for the D2D service, if a handover of the terminal is completed; and
   determining whether to release the D2D resources to the terminal based on a comparison result of the first list and the second list,
   wherein the handover request message is received from a source base station.

3. The method of claim 2, further comprising:
   transmitting, to the MME, a message for a handover including terminal information; and
   receiving the second information based on the terminal information, from the MME, if the D2D resources to the terminal are allocated although the PLMN identifier of the base station does not corresponds to the at least one PLMN identifier of the first list comprised in the first information.

4. The method of claim 1, wherein the handover request message including the first information is received from a target mobility management entity (MME), if that the list corresponding to the at least one PLMN identifier indicating whether the terminal is authorized for the D2D service is provided by the target MME, by a source MME, is determined.

5. The method of claim 1, further comprising transmitting, to the terminal, a message including the first information.

6. The method of claim 1, further comprising receiving, from the terminal, a message including information indicating whether other base stations support the D2D service.

7. A base station in a mobile communication system, the base station comprising:
   a transceiver for transmitting and receiving a signal; and
   a controller configured to:
   control the transceiver to receive a handover request message including first information related to a device-to-device (D2D) service for a terminal, the first information comprising a first list corresponding to at least one public land mobile network (PLMN) identifier indicating whether the terminal is authorized for the D2D service, and
   allocate D2D resources to the terminal based on the handover request message including the first information, if a PLMN identifier of the base station corresponds to the at least one PLMN identifier of the first list comprised in the first information.

8. The base station of claim 7, wherein the controller is further configured to allocate the D2D resources to the terminal, if the terminal is authorized for the PLMN associated with the base station based on the first information.

9. The base station of claim 7, wherein the handover request message is received from a source base station, and wherein the controller is further configured to control the transceiver to receive, from a mobility management entity (MME), second information on the D2D service for the terminal, the second information comprising a second list corresponding to at least one PLMN identifier indicating whether the terminal is authorized for the D2D service, if a handover of the terminal is completed and determine whether to release the D2D resources to the terminal based on a comparison result of the first list and the second list.

10. The base station of claim 9, wherein the controller is further configured to control the transceiver to transmit, to the MME, a message for a handover including terminal information, and
receive the second information based on the terminal information, from the MME, if the D2D resources to the terminal are allocated although the PLMN identifier of the base station does not correspond to the at least one PLMN identifier of the list comprised in the first information.

11. The base station of claim 7, wherein the handover request message including the first information is received from a target mobility management entity (MME), if that the list corresponding to the at least one PLMN identifier indicating whether the terminal is authorized for the D2D service is provided by the target MME, by a source MME, is determined.

12. The base station of claim 7, wherein the controller is further configured to control the transceiver to transmit, to the terminal, a message including the first information.

13. The base station of claim 7, wherein the controller is further configured to control the transceiver to receive, from the terminal, a message including information indicating whether other base stations support the D2D service.

14. The method of claim 1, wherein the allocating further comprises:
if the terminal is authorized for the PLMN associated with the base station based on the first information, allocating the D2D resources to the terminal.

* * * * *